Oct. 30, 1928.
W. GANZ ET AL
1,689,199
FEEDING, CUTTING, ROLLING, AND FORMING MACHINE FOR PLASTIC MATERIAL
Filed Aug. 27, 1920    5 Sheets-Sheet 1
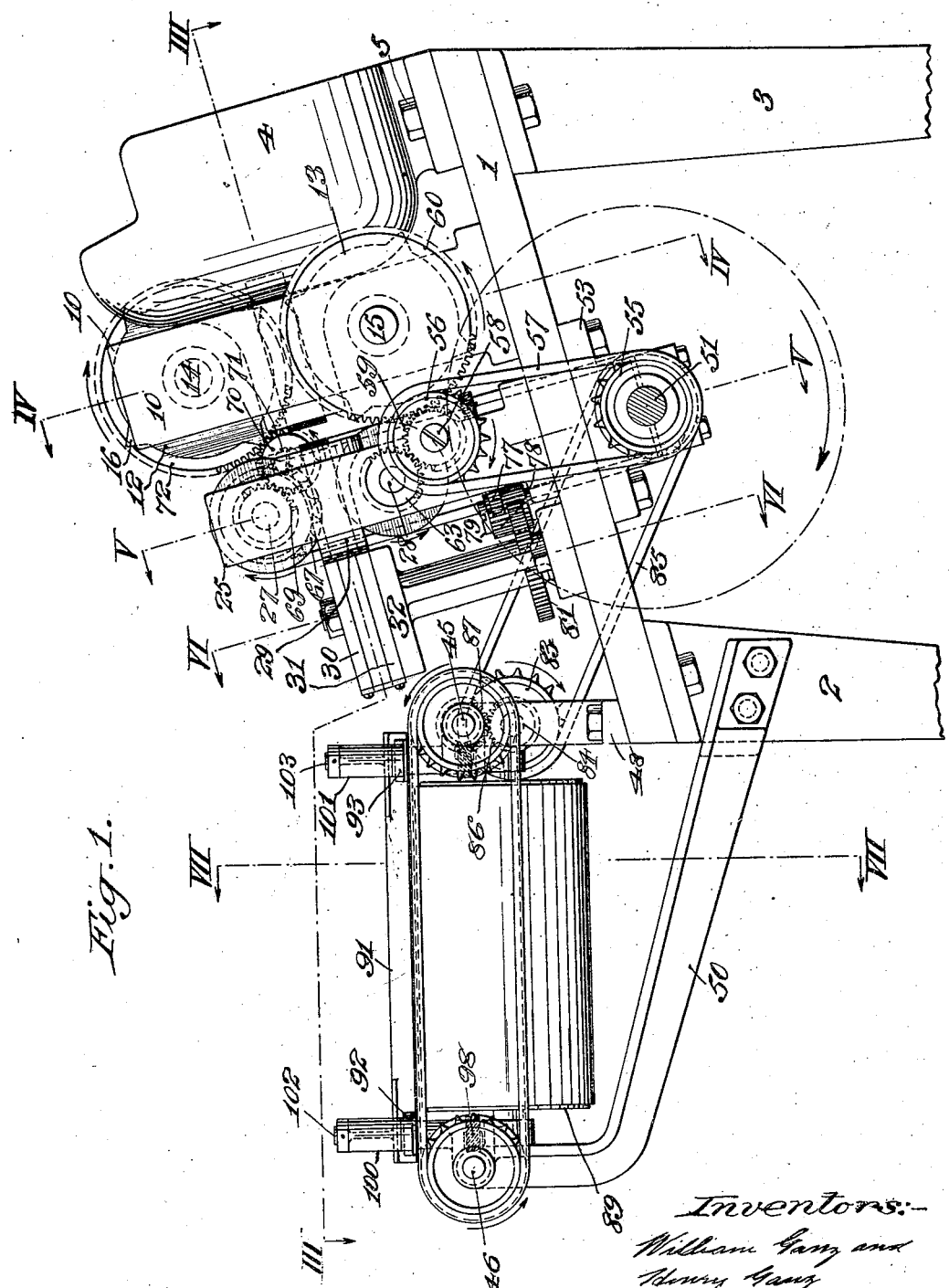

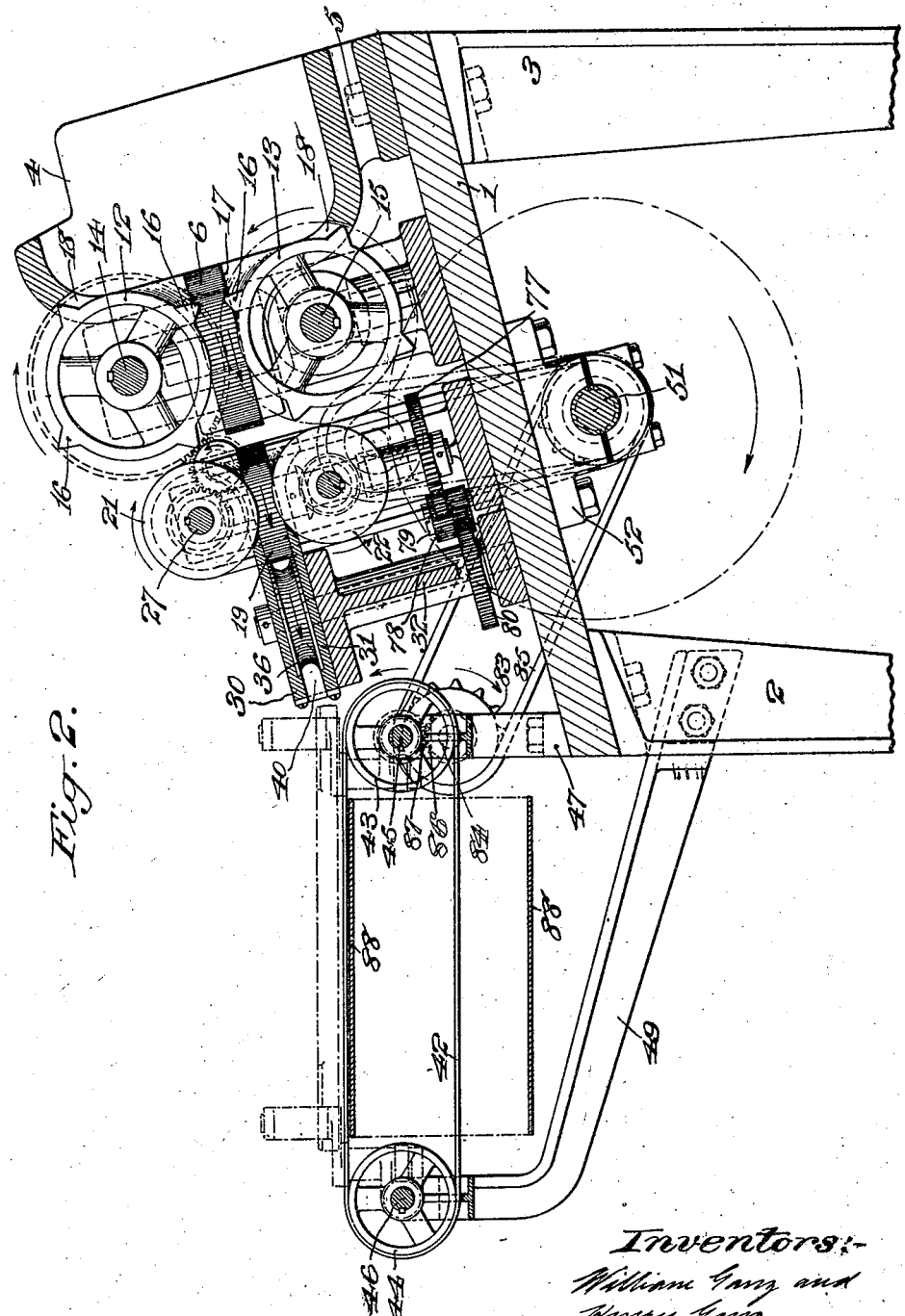

Oct. 30, 1928.  
W. GANZ ET AL  
1,689,199  
FEEDING, CUTTING, ROLLING, AND FORMING MACHINE FOR PLASTIC MATERIAL  
Filed Aug. 27, 1920  
5 Sheets-Sheet 3
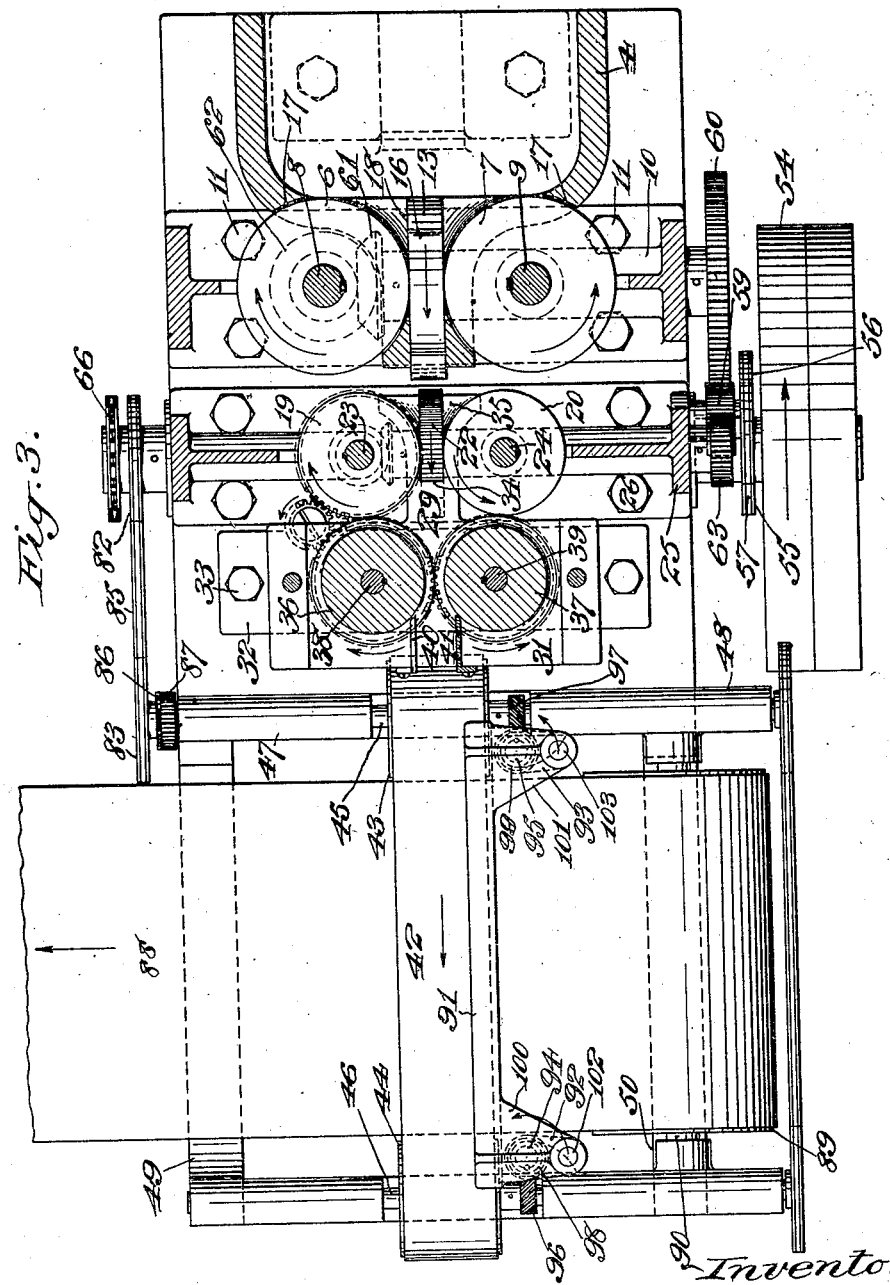

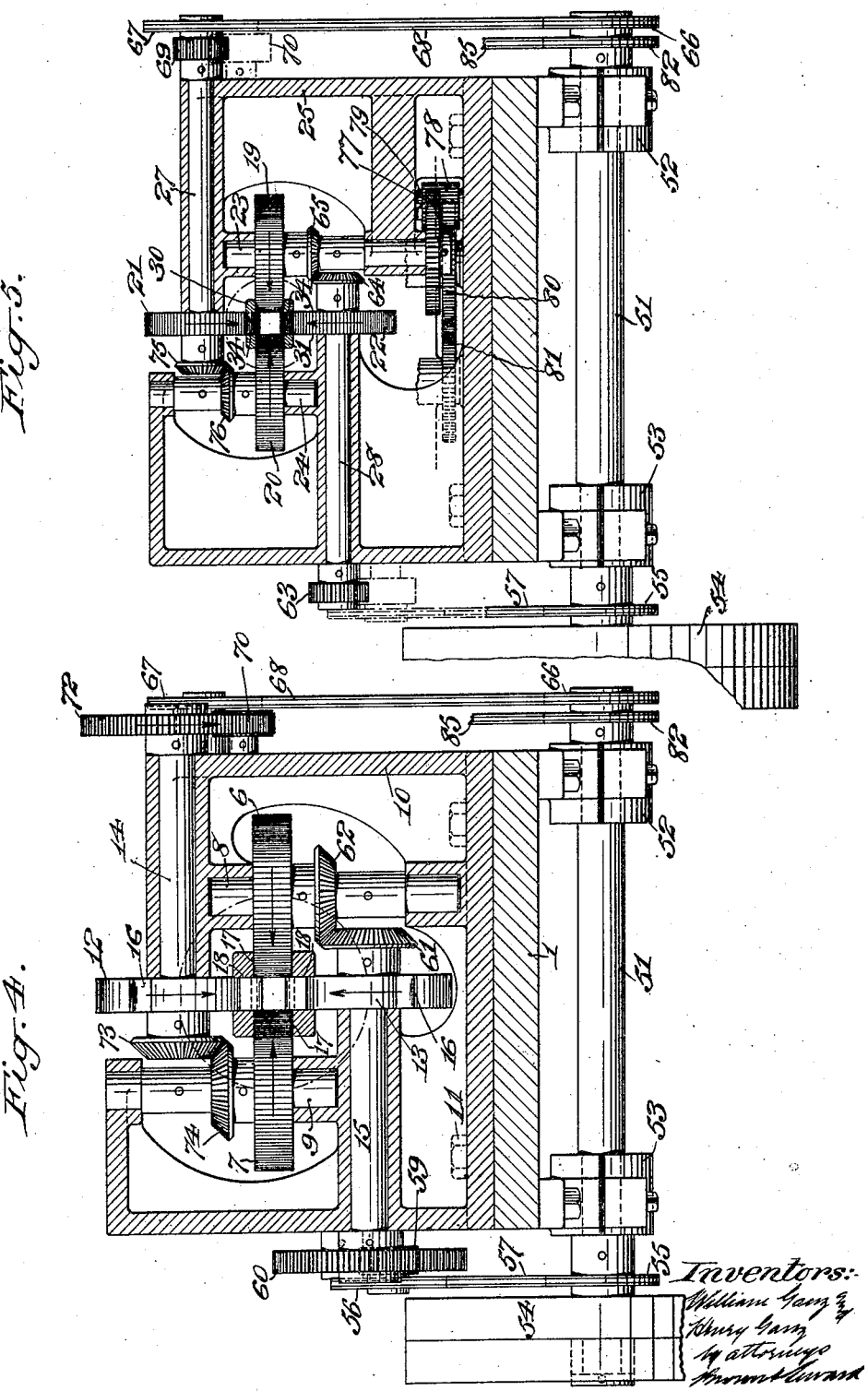
Oct. 30, 1928.  
W. GANZ ET AL  
1,689,199  
FEEDING, CUTTING, ROLLING, AND FORMING MACHINE FOR PLASTIC MATERIAL  
Filed Aug. 27, 1920  
5 Sheets-Sheet 4

Oct. 30, 1928.
W. GANZ ET AL
1,689,199
FEEDING, CUTTING, ROLLING, AND FORMING MACHINE FOR PLASTIC MATERIAL
Filed Aug. 27, 1920    5 Sheets-Sheet 5
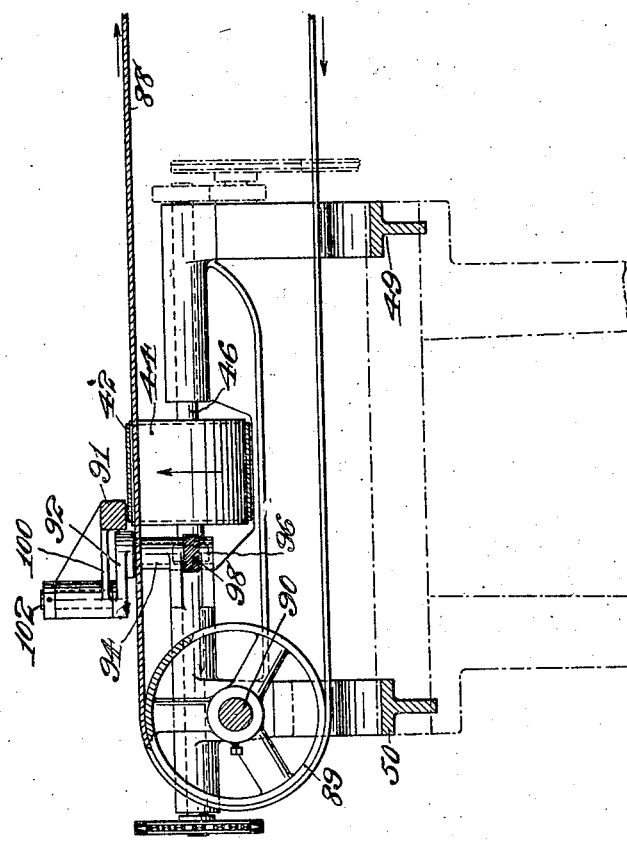
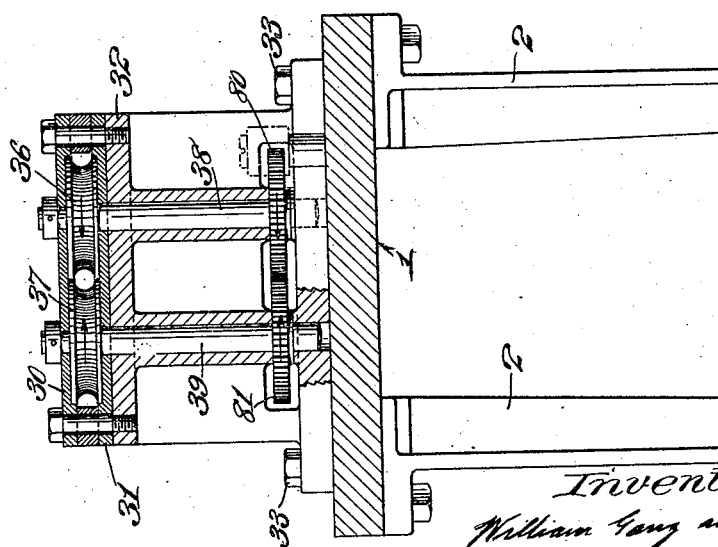

Patented Oct. 30, 1928.

1,689,199

UNITED STATES PATENT OFFICE.

WILLIAM GANZ AND HENRY GANZ, OF RIDGEFIELD PARK, NEW JERSEY, ASSIGNORS TO THE SWEETS COMPANY OF AMERICA, INC., OF NEW YORK, N. Y., A CORPORATION OF VIRGINIA.

FEEDING, CUTTING, ROLLING, AND FORMING MACHINE FOR PLASTIC MATERIAL.

Application filed August 27, 1920. Serial No. 406,477.

This invention relates to improvements in feeding, cutting, rolling and molding machines for plastic material, such as candy, dough, etc., and has for its object to provide a machine of a simple, comparatively inexpensive, compact and strong construction, which shall permit of being conveniently and rapidly operated for progressively feeding, cutting into predetermined lengths, rolling, and molding plastic material in a uniform and regular manner.

Another object is to provide means by which plastic material is cut into uniform lengths and delivered to a carrier to be conveyed away from the machine.

Another object is to provide means for delivering the finished product moving in one direction and means for moving the product to pass it out of the path of the succeeding product and cause it to be carried in another direction.

Another object is to provide certain improvements in the form, construction and arrangement of the several parts whereby the above named and other objects may be effectively attained.

A practical embodiment of my invention is represented in the accompanying drawings, in which—

Fig. 1 represents a side elevation of the machine, the driving pulley being removed and the drive shaft shown in section.

Fig. 2 represents a vertical central section taken from front to rear.

Fig. 3 represents a horizontal section taken in the plane of the line III—III of Fig. 1, looking in the direction of the arrows.

Fig. 4 represents a vertical section taken in the plane of the line IV—IV of Fig. 1, looking in the direction of the arrows.

Fig. 5 represents a vertical section taken in the plane of the line V—V of Fig. 1, looking in the direction of the arrows.

Fig. 6 represents a vertical section taken in the plane of the line VI—VI of Fig. 1, looking in the direction of the arrows, and Fig. 7 represents a detail section of the delivery mechanism.

The table of the machine denoted by 1, is inclined at an angle and supported on legs 2, 3.

A plastic material receiver or hopper 4 is secured to the table 1 by bolts 5.

A pair of horizontally disposed feeding rolls 6, 7 are keyed to vertically arranged shafts 8, 9 mounted in a frame 10, which is fixed to the table 1 by bolts 11. These feeding rolls 6, 7 are spaced apart a sufficient distance to allow a pair of cutting rolls 12, 13 to pass there-between. The cutting rolls 12, 13 are keyed to horizontally arranged shafts 14, 15 mounted in the frame 10. Thus, it will be seen that the feeding rolls 6, 7 are mounted to rotate in a substantially horizontal plane while the cutting rolls are mounted to rotate in a substantially vertical plane. The peripheral surfaces of the feeding rolls 6, 7 are knurled or roughened to grip the plastic material (not shown) and draw it from the receiver. The cutting rolls are each provided with V-shaped teeth 16, in the present instance four are shown on each roll, which are arranged to coact in pairs so that as they pass between the feeding rolls 6, 7 the teeth will be forced into the material and pinch it apart. The peripheries of the cutting rolls 12, 13 between the teeth 16 are substantially of the same diameter as the feeding rolls 6, 7 and assist in feeding the material through the rolls. To allow the plastic material to be fed from the receiver to the feeding and cutting rolls, the receiver is cut away to form a pair of slits 17, in which the feeding rolls may rotate, and a pair of slits 18 arranged at right angles to the slits 17 through which the cutting rolls may pass. The material fed through and cut by the rolls is of oblong form and rectangular in cross section. When the material in its passage forward leaves the feeding and cutting rolls it is guided between reducing or forming rolls, of which the horizontally disposed rolls 19, 20 are spaced apart a sufficient distance to allow vertically arranged rolls 21, 22 to slightly overlap them, leaving a space for the passage of the material.

The reducing or forming rolls 19, 20 are fixed on vertical shafts 23, 24 which are journaled in bearings in a frame 25 secured to the table 1 by bolts 26. The rolls 21, 22 are fixed on horizontal shafts 27, 28 mounted in the frame 25. The peripheral surface of the reducing rolls may be knurled or roughened to insure a more uniform grip upon the material passing therethrough. As the material passes between the reducing rolls 19, 20, 21 and 22 it will be rolled out and caused to pass through a guide 29 extending rearwardly from upper and lower horizontally arranged plates 30, 31 carried by a frame 32 secured to the table by bolts 33. The guide 29 is provided with slots 34 through which the rolls project to engage the material and the rear end of the guide flares outwardly, as shown at 35 in Figs. 2 and 3, to conveniently receive the material from the feeding and cutting rolls.

The material, in passing from the reducing rolls, is forced through the guide 29 into a pair of molding rolls, 36, 37 arranged horizontally between the plates 30, 31 on shafts 38, 39 vertically disposed in the frame 32, where it is again reduced in diameter and molded into cylindrical or other form. Strippers 40, 41 are arranged in position on the frame 32, to strip the material from the molding rolls and direct it onto an endless belt 42, mounted on pulleys 43, 44 carried by shafts 45, 46, of which the shaft 45 is journaled in bearings on standards 47, 48 uprising from the table 1, and the shaft 46 is journaled in bearings carried by brackets 49, 50 extending outwardly from and secured to the legs 2.

The several elements above described receive their rotary motion in the following manner.

A drive shaft 51 is mounted in bearings 52, 53 carried by the underside of the table 1 and receives its motion from a source of power (not shown) through pulley 54. The cutting roll 13 is driven from the shaft 51 through sprockets 55, 56 and chain 57, of which the sprocket 55 is carried by the shaft 51 and the sprocket 56 loosely mounted on a stud 58, fixed on the frame 25. A spur gear 59 is carried by the sprocket 56 and meshes with the gear 60 fast on the shaft 15 of the cutting roll 13. The feeding roll 6 receives its motion from the shaft 15 through bevel gears 61, 62. The spur gear 59 also meshes with a gear 63 on the shaft 28 of the reducing roll 22. The roll 19 is rotated from a bevel gear 64 on the shaft 28 meshing with a bevel gear 65 on the shaft 23. The roll 21 receives its motion through a sprocket and chain connection having a sprocket 66 on the shaft 51, a sprocket 67 on the shaft 27 and a chain 68 connecting the sprockets. A spur gear 69 pinned on the shaft 27 is arranged to mesh with an idler gear 70 mounted on a stud 71 fixed in the frame 25, which idler gear 70 meshes with a gear 72 fast on the shaft 14 of the cutting roll 12. The feeding roll 7 receives its motion from the shaft 14 through bevel gears 73, 74, of which the bevel gear 73 is pinned to the shaft 14 and the bevel gear 74 pinned to the shaft 9. The roll 20 is rotated from the shaft 27 by means of a bevel gear 75 on the shaft 27 meshing with a bevel gear 76 on the shaft 24 of the roll.

The molding roll 36 is driven from the shaft 23 through a gear 77 meshing with an idler gear 78 loosely mounted on a stud 79, which idler gear 78 meshes with a gear 80 fixed on the shaft 38 of the roll 36. The molding roll 37 is rotated from the gear 80 by means of a gear 81 fast on the shaft 39 of the roll.

The endless belt 42 is driven from the shaft 51 by means of a sprocket and chain connection of which a sprocket 82 is carried by the shaft 51, a sprocket 83 loosely mounted on a stud 84 fixed on a standard 47, and a chain 85 connecting the sprockets 82, 83. The sprocket 83 has secured thereto a spur gear 86 which meshes with a spur gear 87 fast on the shaft 45 of the pulley 43.

After the molded product has traveled a predetermined distance on the belt 42, it is desired to move the product therefrom to a conveyor formed of an apron 88, which passes around a pulley 89 mountd on a shaft 90 journaled in bearings on the standard 48 and bracket 50. This apron 88 is arranged to travel in a plane at right angles to the belt 42 and driven from a source of power (not shown). The arrangement of the apron 88 with respect to the belt 42 is such that the conveying surface of the apron 88 is passed immediately below the conveying surface of the belt 42, so that the molded product may be conveniently moved from the belt 42 to the apron 88.

The molded product is moved laterally by means of a bar 91 which is reciprocated by means of cranks 92, 93 mounted on vertical shafts 94, 95 carried in bearings projecting outwardly from the standard 48 and bracket 50. The shafts 94, 95 are rotated by means of spiral gears 96, 97 on the shafts 45, 46, meshing with spiral gears 98, 99 carried by the shafts 94, 95. The bar 91 is provided with rearwardly extending arms 100, 101 which are mounted on pins 102, 103 uprising from the cranks 92, 93 to support and control the movement of the bar.

To compensate for the diameter of the material being reduced as it passes through the rolls 19, 20, 21 and 22, it is necessary to increase the speed of these rolls, so that the material will be extended lengthwise. This difference in the speed of the rolls is produced through the gears 60 and 72 on the shafts 15 and 14 respectively of the cutter rolls being of larger diameter than the gears 69 and 63 carried by the shafts 27 and 28 respectively of the reducing rolls. The gears 60 and 63 are driven by the gear 59 and the gears 72 and 69 mesh with the gear 70.

The speed of the belt 42 is equal to the peripheral speed of the molding rolls 36, 37 so that the molded product will be delivered at a uniform speed without being dragged or its progress retarded.

The movement of the bar is so timed that the molded product will be moved from the belt 42 to the apron 88 and the bar returned to its inoperative position while the succeeding molded product is being delivered to the belt 42.

In operation the plastic material is forced by gravity, manual or mechanical pressure from the receiver 4 into and through the slits 17, 18 to the feeding and cutting rolls, where it will be first formed into an elongated body rectangular in cross section, and then cut into lengths by the coaction of the teeth 16 on the cutting rolls 12, 13. The teeth 16 on the cutting rolls are arranged to pass through their slits so as to dig into the body or mass of the material in the receiver and draw it toward and between the feeding and cutting rolls 6, 7, 12 and 13. The material upon being forced from the slits is caused to pass between the feeding rolls 6, 7 and the peripheries of the rolls 12, 13, and formed into an elongated block rectangular in cross section, which block is partially severed from the body by the coaction of the teeth 16 of the cutting rolls 12, 13. As one set of teeth 16 is pinching the material from the body between the feeding rolls 6, 7 into lengths, the succeeding set of teeth is digging into the body of the material thereby holding it in contact with the slits. It will therefore be seen that after the block is pinched by the teeth 16 there is sufficient material remaining between the feeding rolls to be gripped thereby and forced forward between the cutting rolls 12, 13. The cut lengths of material are carried forward by the feeding and cutting rolls into the flared mouth 35 of the guide 29 where it comes in contact with the reducing rolls 19, 20, 21 and 22, which reduces its diameter and forces it forward through the guide 29 to the molding rolls 36, 37. The molding rolls acting upon the material causes it to assume a cylindrical form in cross section, and delivers it to the belt 42 which carries it outwardly away from the machine in front of the reciprocating bar 91, which in turn moves the product laterally from the belt 42 where it falls to the apron 88 to be carried away from the machine for further treatment.

It is obvious that various changes may be resorted to in the form, construction and arrangement of the several elements without departing from the spirit and scope of our invention, and hence we do not intend to be limited to the details herein shown and described except as they may be specifically included in the claims.

What we claim is:

1. A machine of the character described comprising, a receiver for the plastic material, said receiver being provided with a forwardly projecting mouth having diametrically opposed slots therein, a pair of feeding rolls mounted to rotate in certain of said slots with their feeding surfaces flush with the inner walls of the mouth, a second pair of feeding rolls provided with feeding surfaces and cutting means alternately arranged thereon and mounted to rotate in other of the slots, said feeding surfaces disposed flush with the inner walls of the mouth and said cutting means arranged to pass through their slots into the receiver, whereby the feeding rolls will simultaneously feed, form and cut the material into predetermined lengths in the mouth of the receiver.

2. A machine of the character described comprising, a receiver for the plastic material, said receiver being provided with a forwardly projecting mouth having diametrically opposed slots therein, a pair of feeding rolls mounted to rotate in certain of said slots with their feeding surfaces flush with the inner walls of the mouth, a second pair of feeding rolls provided with feeding surfaces and cutting means alternately arranged thereon and mounted to rotate in other of the slots, said feeding surfaces disposed flush with the inner walls of the mouth and said cutting means arranged to pass through their slots into the receiver, whereby the feeding rolls will simultaneously feed, form and cut the material into predetermined lengths in the mouth of the receiver, reducing rolls for receiving the lengths of material from the feeding rolls, said reducing rolls being disposed in pairs at right angles to each other with the axes of the rolls being arranged in substantially the same vertical plane, and a pair of contour rolls for molding each length of material into a rod.

3. A machine of the character described comprising, a receiver for the plastic material, said receiver being provided with a forwardly projecting mouth having diametrically opposed slots therein, a pair of feeding rolls mounted to rotate in certain of said slots with their feeding surfaces flush with the inner walls of the mouth, a second pair of feeding rolls provided with feeding surfaces and cutting means alternately arranged thereon and mounted to rotate in other of the slots, said feeding surfaces disposed flush with the inner walls of the mouth and said cutting means arranged to pass through their slots into the receiver, whereby the feeding rolls will simultaneously feed, form and cut the material into predetermined lengths in the mouth of the receiver, reducing rolls for receiving the lengths of material from the feeding rolls, said reducing rolls being disposed in pairs at right angles to each other with the axes of the rolls being arranged in substantially the same vertical plane, a pair of contour rolls for molding each length of material into a rod, an endless conveyor for receiving the molded material longitudinally thereon, a second conveyor disposed beneath and at right angles to said first named conveyor, and a continuously reciprocating device comprising horizontally rotatable cranks, and a bar mounted thereon for moving the material laterally from the first named conveyor to the other conveyor.

In testimony, that we claim the foregoing as our invention, we have signed our names this 23rd day of August, 1920.

WILLIAM GANZ.
HENRY GANZ.